March 4, 1969  J. E. MACK  3,430,642
ACCELERATION-RESPONSIVE VALVE ASSEMBLIES
Filed Oct. 8, 1965  Sheet 3 of 3

INVENTOR
JOHN E. MACK
BY
Watson, Cole, Grindle + Watson
ATTORNEYS

United States Patent Office

3,430,642
Patented Mar. 4, 1969

3,430,642
ACCELERATION-RESPONSIVE VALVE ASSEMBLIES
John E. Mack, Redditch, England, assignor to The Hymatic Engineering Company Limited, a company of Great Britain
Filed Oct. 8, 1965, Ser. No. 494,058
Claims priority, application Great Britain, Oct. 8, 1964, 41,114/64
U.S. Cl. 137—39                          7 Claims
Int. Cl. G05d 1/00, 16/00

ABSTRACT OF THE DISCLOSURE

An acceleration-responsive valve assembly for admitting gas from a supply to an output at an output pressure which depends on acceleration and which is required at a given acceleration to rise rapidly from the ambient pressure to what may be termed the knee pressure and thereafter to increase steadily at a chosen lower rate with further increase of acceleration, including an inertia mass subject to the acceleration, means defining a space referred to herein as a control space, a pilot valve having a moving member acted on by the inertia mass to establish in the control space a control pressure corresponding to the acceleration, means defining a space referred to herein as a knee pressure space communicating with the control space through a restricted orifice, a knee pressure space to exhaust, means responsive to the pressure in the knee pressure space for applying to the pilot valve a force corresponding to the said pressure, and a main servo valve controlling flow from the supply to the output and itself controlled in accordance with the control pressure.

---

Figure 1:
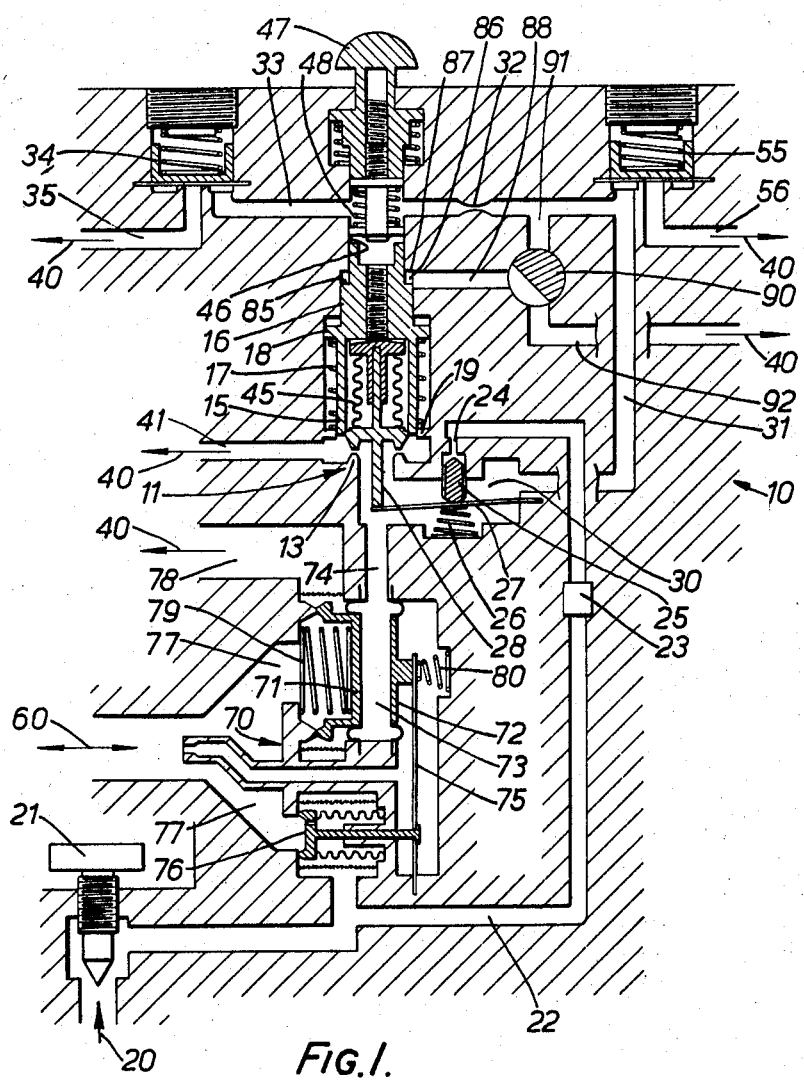

This invention relates to acceleration-responsive valve assemblies and one application of the invention (to which it is not however restricted) is to the provision of a so-called anti-g valve for controlling the admission of fluid under pressure to the anti-g suit of the occupant of an aircraft in order to apply pressure to the lower part of his body to prevent black-out as a result of acceleration.

One object of the invention is to provide a more refined or compact acceleration-responsive valve assembly.

According to the present invention an acceleration-responsive valve assembly for admitting gas from a supply to an output at an output pressure depending on acceleration, includes a pilot valve having a moving member acted on by an inertia mass subject to the acceleration, and arranged to establish a control pressure corresponding to the acceleration, and a main servo valve controlling flow from the supply to the output, and itself controlled in accordance with the control pressure.

Preferably the pilot valve is controlled in accordance with either the control pressure or the output pressure as well as the acceleration. The arrangement may then be such that acceleration tends to close the pilot valve against the action of a spring and against the action of the control pressure.

In a preferred arrangement the control pressure is established in a control pressure space connected to a supply through a restricted orifice and connected to exhaust through the pilot valve.

For certain applications, such as that referred to above it is desirable that when the acceleration reaches a certain value the output pressure should rise rapidly from the ambient pressure to what may be termed the knee pressure, after which it should increase steadily at a chosen rate with further increase of acceleration. For this purpose the control pressure space may be connected through a downstream restricted orifice to a knee pressure space which in turn is connected to exhaust through a pressure relief valve, the pressure in the knee pressure space being applied to tend to close the pilot valve.

In one form of the invention means is provided for varying the gradient of the curve relating control pressure to acceleration. Such means may comprise a valve capable of manual actuation to admit the control pressure to a surface of the inertia mass or pilot valve member. Conveniently the said surface is a small surface arranged so that pressure on it tends to close the pilot valve. and the manually controlled valve permits either exhaust pressure or control pressure to be applied to it, so that in the latter condition a higher value of control pressure will be required to maintain the valve in equilibrium at a given value of acceleration.

For some applications it may be desirable to limit the maximum output pressure by arranging that the gradient is reduced to zero—or a very low value—above a certain intermediate value of $g$. For this purpose the control-pressure space may be connected to exhaust through a control pressure relief valve to limit the maximum value of the control pressure and hence of the output pressure. This value is determined at higher values of $g$ by the setting of this relief valve.

Another function of this relief valve, in conjunction with the main servo valve, is to provide a safety valve which limits the output pressure to a safe value under other conditions—e.g. fault conditions.

Moreover this pressure relief valve may be constructed and arranged to respond to the same acceleration as the pilot valve, so as to increase the maximum control pressure as the acceleration increases. In this way the arrangement will be given a double slope characteristic, the output pressure increasing relatively steeply with acceleration from the knee value over a lower working range, and thereafter being controlled by the control pressure relief valve to a value which increases more gradually with acceleration.

In addition if the ambient pressure should fall below a predetermined value (for example if the pressurisation in an aircraft cabin should fail), it may be desirable to maintain the output pressure at a certain value, generally a comparatively low value. For this purpose the pilot valve member may be connected to the inertia mass through an evacuated bellows associated with a spring so that if the ambient pressure falls below a given value the pilot valve will close to supply to the output a pressure depending on the characteristics of the bellows and its spring. If at this time the valve is accelerated the output pressure will be determined by either the bellows or the inertia mass, whichever produces the highest control pressure.

The main servo valve may be constructed in different ways. In one arrangement it comprises two diaphragms each subjected to output pressure on one side and control pressure on the other side, one diaphragm actuating an inlet valve to connect the output to the supply when the control pressure exceeds by a given amount the output pressure and the other actuating an exhaust valve to connect the output to exhaust whenever the control pressure does not exceed the output pressure by a certain amount.

To conserve the fluid supplies when the pilot valve is open the bleed through the restricting orifice may be stopped by an automatic valve which is closed by a spring whenever control pressure is not required. Thus the arrangement may include a stop valve actuated automatically by the pilot valve to cut off the flow from the supply through the restricted orifice to the control pressure space when the pilot valve is in its fully open position and to open when the pilot valve begins to move from that position.

Conveniently the automatic stop valve is arranged on the downstream side of the restricted orifice.

Also to conserve supply, a manual input stop-valve may be incorporated to isolate the valve from the fluid supply during long periods of inactivity or in the event of loss of fluid through failure of some part of the anti-*g* system.

For operation with a supply which has excessive pressure variations during use, a coarse pressure regulating valve may also be incorporated at the input to the valve.

Figure 2:
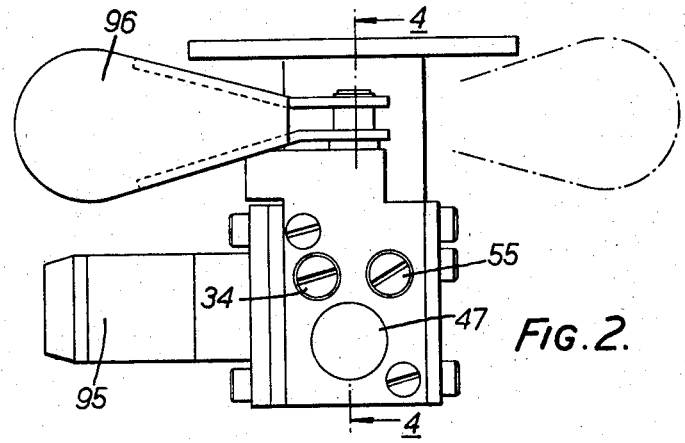
Figure 3:
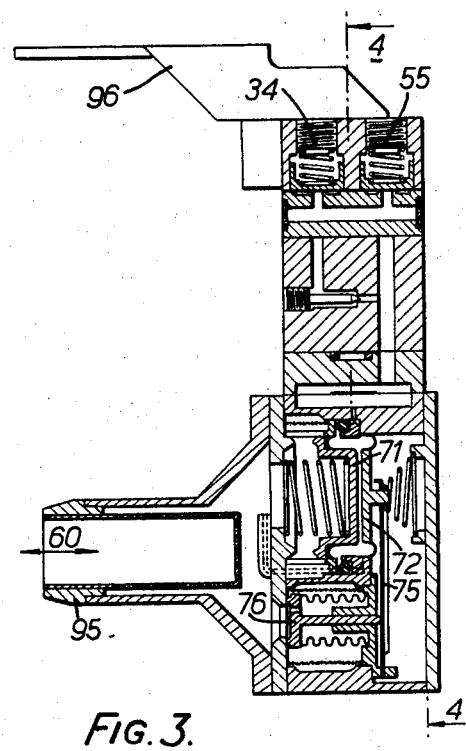
Figure 4:
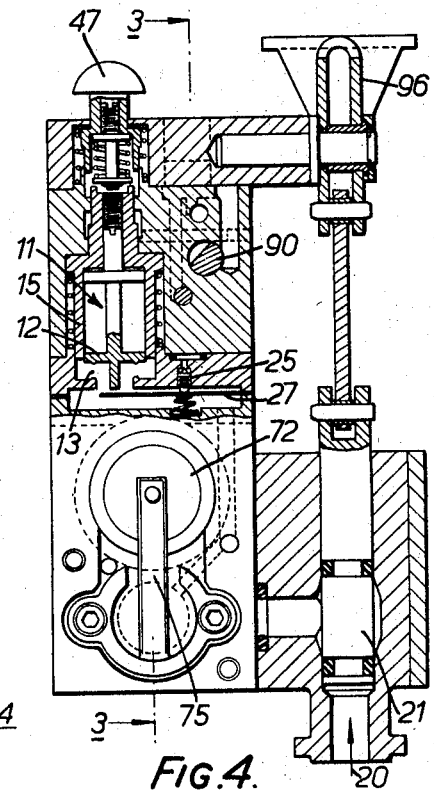
Figure 5:
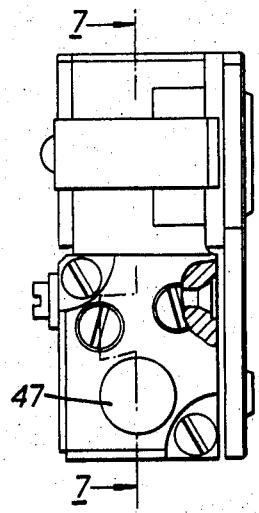
Figure 6:
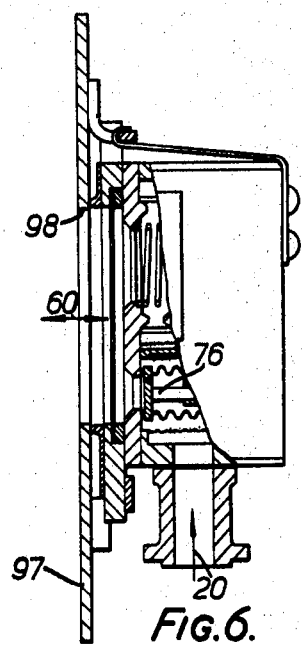
Figure 7:
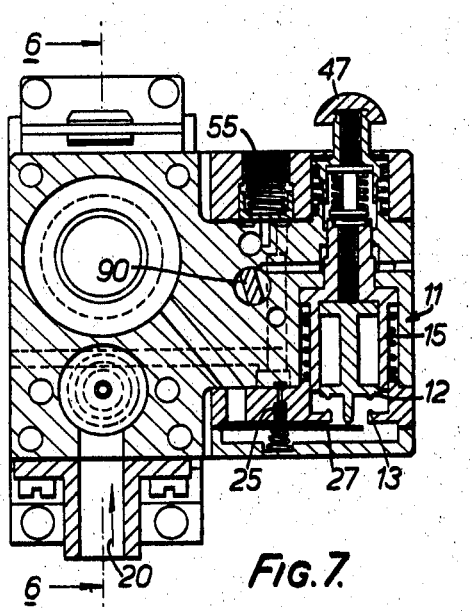

The invention may be performed in various ways, but one specific embodiment, with minor modifications, will be described by way of example with reference to the accompanying drawings, in which:

FIGURE 1 is a diagram of the pneumatic circuits of an anti-*g* valve assembly;

FIGURES 2, 3 and 4 are respectively a plan view, a sectional elevation on the line 3—3 of FIGURE 4 and a sectional elevation on the various planes represented by the lines 4—4 of FIGURES 2 and 3, of a corresponding valve assembly for mounting in aircraft, and FIGURES 5, 6 and 7 are respectively a plan view, a sectional elevation on the line 6—6 of FIGURE 7, and a sectional elevation on the line 7—7 of FIGURE 5, of the corresponding assembly arranged for securing to a pilot's suit.

The operation of the assembly and the fluid connections between the various parts of it can be followed from the diagram of FIGURE 1, whilst the actual physical layout may be effected either as shown in FIGURES 2 to 4, or as shown in FIGURES 5 to 7.

The assembly comprises a housing 10 containing a pilot valve 11 in the form of a disc 12 co-operating with a fixed seating 13. Bearing upon the periphery of the disc on the side remote from the seating is one end of a sleeve 15 whose other end is formed integral with an inertia mass 16 which exerts on the valve disc a force corresponding to the acceleration to which the device is to respond. A helical compression spring 17 surrounds the sleeve 15 of the inertia mass and is interposed between a flange 18 of the sleeve and a fixed flange 19 so as to tend to move the sleeve and valve away from the seating. For convenience of description it will be assumed that the disc is mounted with its axis vertical and rests on top of the seating.

Gas under pressure from a supply 20 is admitted past a main stop valve 21 to a passage 22 and past a filter 23 to a restricted orifice 24. The down stream end of the orifice 24 serves as a seating for an economy valve 25, which, when open, allows gas to flow into a control pressure space 30.

The control space is connected to the space under the pilot valve disc inside the seating, whilst the space outside the seating is connected through a passage 41 to exhaust 40. From the control pressure space, the fluid can also flow through a passage 31, and a further restricted orifice 32 to what will be termed a knee pressure space 33 and thence, if the pressure is high enough, past a knee pressure relief valve 34 and a passage 35 to exhaust 40.

The economy valve 25 is acted upon by a spring 26 tending to close it and a lever 27 arranged to be actuated by a plunger 28 projecting downwards from the pilot valve disc 12. Accordingly when the pilot valve is open, the economy valve 25 closes, and prevents waste of gas during the usual conditions of low acceleration.

The inertia mass 16 is connected to the pilot valve disc 12 by an evacuated bellows 45 housed within the sleeve 15, so that under normal circumstances the valve disc will remain in contact with the lower end of the sleeve but if the ambient pressure should fall below a predetermined value, for example if the pressurisation in an aircraft cabin should fail, the bellows will distend allowing the valve disc to descend to its closed position even though the inertia mass should remain in its uppermost position.

The upper end of the inertia mass is formed as a piston working in a cylinder 46 open to the knee pressure space 33. The upper end of the cylinder is closed by a test button 47, a helical compression spring 48 being interposed between the test button and the inertia mass. Thus the test button can be manually depressed to apply a force to the inertia mass to simulate the effect of acceleration.

The control space 30 is also connected to exhaust 40 through the passage 31 and a pressure relief valve 55 and a passage 56 to ensure that the control pressure cannot exceed a predetermined maximum value.

The main flow of air to the output 60, for example the anti-*g* suit, is controlled by a main servo valve assembly 70 comprising two diaphragms 71 and 72 forming opposite walls of a chamber 73 to which fluid at the control pressure is admitted from the space 30 through a passage 74. One diaphragm 72 acts on a lever 75 controlling a bellows-balanced inlet valve 76 connecting the supply passage 22 to a passage 77 leading to the output. The other diaphragm 71 itself forms the movable valve member of an exhaust valve connecting the output passage 77 through a passage 78 to exhaust 40. Thus the main valve assembly serves to control flow into or out of the output so as to maintain the output pressure at all times in a given relationship to the control pressure. Acually the diaphragms 71 and 72 are acted on by compression coil springs 79 and 80 so that the output pressure will always fall short of the control pressure by a small almost constant amount (except when control pressure is nearly equal to ambient pressure).

At rest, the pilot valve is held open by its spring 17 (which is preloaded) and vents the control pressure space 30 to exhaust, so that the control pressure is equal to the exhaust pressure and hence the output pressure is substantially equal to the exhaust pressure.

In any event the economy valve is at this time closed to cut off the control pressure space from the supply.

When acceleration occurs in the chosen direction the force required to accelerate the inertia mass 16 builds up and, for example at a value of something approching 2*g*, exceeds that exerted by the preloaded pilot valve spring 17, and the inertia mass begins to move the pilot valve towards its closed position.

After initial movement of the pilot valve from its fully open position, the plunger 28 depresses the lever 27 against its preloaded spring 26 and opens the economy valve 25 so as to allow gas from the supply to flow through the upstream orifice 24 into the control pressure space 30. This occurs at an acceleration of say 2.2*g*. The dimensions of the upstream orifice 24 are such that the flow through it is always independent of the pressure on its downstream side, that is to say the control pressure.

Neglecting for the moment the pressure in the cylinder 46 and the knee pressure space 33, it will be noted that the control pressure acts upwardly on the pilot valve 12 in opposition to the inertia force. Accordingly as the pilot valve closes sufficiently to restrict the escape of gas from the control space, the control pressure will tend to build up so as to balance the difference between the inertia force corresponding to the acceleration and the force exerted by the pilot valve spring 17 (assisted by the spring 26 of the automatic stop valve 25). Accordingly the basic tendency of the arrangement is for the control pressure to build up in proportion to the acceleration with the pilot valve assuming a position of equilibrium at any given value of acceleration.

This operation is modified by the arrangement of the knee pressure space 33. Thus when the control pressure first begins to build up, gas will flow from the control pressure space through the knee restricted orifice 32 to the knee pressure space, whence it is prevented from escaping by the knee relief valve 34 so that the pressure in the knee pressure space and in the cylinder 46 will be equal to the control pressure. In other words, the control pressure is applied to the underside of the pilot valve 12 and also to a substantially equal (or even slightly greater) area in the cylinder 46. Accordingly when the force corresponding to the acceleration exceeds the preloading of the spring 17 there is nothing to balance the resultant, and the pilot valve moves rapidly in the closing direction, so that the control pressure builds up rapidly to the value at which the knee pressure relief valve opens.

Thereafter, the pressure in the knee pressure space 33 remains substantially constant and hence any build-up of the control pressure tends to reopen the pilot valve which assumes an equilibrium position depending upon the balance between on the one hand the acceleration tending to close the valve and on the other hand the control pressure and the spring tending to open it. Hence the control pressure will correspond to the magnitude of the acceleration and as already indicated the output pressure will closely follow the control pressure.

The knee restricted orifice 32 is such as to permit a considerably smaller flow than that permitted by the upstream orifice 24, since it is only called upon to establish the knee pressure, and hence it does not appreciably affect the operation of the pilot valve in establishing the control pressure.

If the ambient pressure falls below a certain value the evacuated bellows 45 distends to move the pilot valve towards its closed position, first opening the economy valve. The area on which control pressure acts on the underside of the pilot valve is equal to the effective area of the bellows. The control pressure is, therefore, maintained above a minimum absolute value which is set by the resilient force of the bellows itself, less the force exerted by the lever 27 of the economy valve. Alternatively the effective area of the bellows may be made somewhat different from the area under the pilot valve, in which case the minimum absolute control pressure can be made to change somewhat with ambient pressure.

Knee pressure at this time is insufficient to actuate the inertia weight against the combination of its preloaded spring 17 and the force of the capsule.

As before, the output pressure to the suit responds to changes in control pressure.

The pressure relief valve 55 may be designed merely as a safety device to prevent undue rise of the control pressure in the event of faulty operation of part of the system, bearing in mind that the supply pressure might be about 100 p.s.i. while the maximum control pressure might be about 10 p.s.i. Alternatively the valve 55 may be set to open at a control pressure corresponding to an acceleration less than the maximum expected in operation, for example an acceleration of 6$g$ when the maximum might be 8$g$ or more.

In this case as acceleration builds up there will be no control pressure and no pressure in the anti-$g$ suit until the acceleration reaches a threshold value of say a little over 2$g$. At this point the pilot valve will suddenly move towards its closed position and the control pressure will rapidly build up to the knee pressure value. Further rise of acceleration produces a gradual and corresponding rise of control pressure up to a maximum at which the pressure relief valve 55 opens, say 6$g$, beyond which the control pressure will remain constant. The output pressure will at all times follow the control pressure.

In a modified arrangement the pressure relief valve 55 is itself made responsive to acceleration, the weight of its moving parts being chosen in relation to the strength of its spring and the area acted on by the gas, to cause its pressure setting to vary in a desired manner with acceleration.

In this way the arrangement may be given a double slope characteristic, the operation being similar to that described above except that, when the pressure relief valve 55 has opened, the control pressure (and with it the output pressure) rises slowly with acceleration instead of remaining constant. In these circumstances it may be thought desirable to adjust the pressure relief valve 55 to start opening at a lower acceleration, for example 5$g$.

Below its upper end the inertia mass is formed with a shoulder 85 forming an annular piston fitting in an annular cylinder 86 formed by a shoulder 87 in the cylinder 46. The annular cylinder 86 is connected through a passage 88 and a manually actuated two-way valve 90 either to a passage 91 leading to the control space or to a passage 92 leading to exhaust 40. When it is connected to exhaust the operation is as already described. If, on the other hand, it is connected to the control space, the resultant area of the pilot valve on which the control pressure acts so as to tend to open the pilot valve is substantially reduced, and hence a substantially higher control pressure will correspond to a given value of acceleration. Thus the knee pressure will be higher and in addition the gradient of the curve relating control pressure to acceleration above the knee will be substantially steeper. By suitable design of the two-way valve 90 so as to restrict the flow to the annular cylinder 86 and to exhaust it is possible in effect to obtain intermediate gradients.

As compared with a known form of anti-$g$ valve assembly in which the output-pressure control valve is directly actuated by the inertia mass, in which the evacuated bellows is external to that mass; in which the knee in the characteristic is produced by a relaxing piston; and in which the gradient is changed by altering the value of the inertia mass, the present construction results in a lighter and more compact component, apart from offering certain additional facilities. In fact, by employing for the anti-$g$ function a pilot valve which would be incorporated in any case to amplify the force of the evacuated bellows, the size and weight of the assembly are much reduced. This is illustrated in FIGURES 2 to 7 which show the actual physical shape and arrangement of certain assemblies.

The arrangement shown in FIGURES 2 to 4 is intended for mounting on an aircraft and the outlet 60 is represented by a pipe connector 95 for connection by a hose to the pilot's suit. In this arrangement the pilot valve is mounted on top of the main valve, and the stop valve 21 is actuated by a pivoted handle 96.

The arrangement of FIGURES 5 to 7 is intended for mounting on the pilot's suit and for this purpose is provided with a plate 97 for securing to the suit. The plate 97 has in it an opening 98 registering with an opening in the pilot's suit and constituting the outlet of the valve assembly. In this case, as shown in FIGURE 7, the pilot valve is mounted in a compact unit alongside the main valve.

What I claim as my invention and desire to secure by Letters Patent is:

1. An acceleration-responsive valve assembly for admitting gas from a supply to an output at an output pressure responsive to acceleration and which, at a given acceleration, is capable of rising rapidly from an ambient pressure to a higher pressure and thereafter to increase at a lower rate of pressure with a further increase of acceleration, comprising in combination:

a gas supply means for admitting gas to the assembly at a predetermined pressure;

a gas output means for discharging gas at a pressure depending on acceleration;

a first means interconnetcing said supply and output means for providing a control pressure for the assembly;

a pilot valve means on said first interconnecting means for regulating the output pressure at said output means, said pilot valve means comprising a valve disc and a seating for said disc;

a first gas exhaust means in communication with said pilot valve means for allowing gas to escape before discharging from said output means;

an inertia mass connected to said pilot valve means movable in response to acceleration so that as acceleration increases, said mass exerts a closing force on said pilot valve means whereby said disc approaches said seating and the control pressure is accordingly increased;

a second gas exhaust means;

a second means interconnecting said first interconnecting means and said second exhaust means for providing a knee pressure for the assembly, said second interconnecting means communicating with a top portion of said inertia mass;

a first pressure relief valve on said second interconnecting means;

means for restricting said second interconnecting means; and, a main servo valve on said first interconnecting means between said pilot valve means and said valve means, said servo valve being controlled by the control pressure to vary the output pressure in accordance therewith, the control pressure building up rapidly with initial acceleration thereby tending to balance the acceleration of said mass and open said pilot valve means, the control pressure further increasing rapidly as the knee pressure, being exerted on said mass through said second interconnecting means, tends to close said pilot valve means, and the control pressure still further increasing, but at a much slower rate, as a pressure drop occurs at said restricting means when the knee pressure exhausts through said second exhaust means past first pressure relief valve.

2. The assembly according to claim 1 wherein a coil spring is provided about said inertia mass whereby the acceleration and the knee pressure tend to close said pilot valve means against both the action of said spring and the action of the control pressure.

3. The assembly according to claim 1 wherein a third means is provided interconnecting said second interconnecting means with a portion near the top of said inertia mass, and wherein a manually operable valve is provided in said third interconnecting means so that control pressure may be admitted thereby to said mass near said top portion whereby a higher value of control pressure will be required to maintain said pilot valve means in equilibrium at a given value of acceleration.

4. The assembly according to claim 1 wherein a second pressure relief valve and a third exhaust means is provided on said second interconnecting means to limit the maximum value of the control pressure and therefore of the output pressure.

5. The assembly according to claim 1 wherein said pilot valve means is connected to said inertia mass through an evacuated bellows so that if the ambient pressure falls below a given value, said pilot valve means will start to close as said bellows distends, thereby supplying to said output means a pressure depending on the characteristics of said bellows.

6. The assembly according to claim 1 wherein a stop valve is provided on said first interconnecting means and connected to said pilot valve means movable to an open position when said pilot valve means becomes closed whereby the gas flow from said supply means may be cut off when said pilot valve means is in its open position.

7. The assembly of claim 1 wherein said main servo valve comprises:

first and second diaphragms, each subjected to output pressure on one side thereof and control pressure on the other side thereof;

an inlet valve provided between said output means and said supply means actuated by said first diaphragm when the control pressure exceeds the output pressure;

fourth exhaust means provided at said output means; and, an exhaust valve provided between said output means and said fourth exhaust means actuated by said second diaphragm when the control pressure falls short of the output pressure.

References Cited

UNITED STATES PATENTS

| 2,748,786 | 6/1956 | Isreeli | 137—38 |
| 2,823,687 | 2/1958 | Gabriel | 137—38 |
| 2,952,264 | 9/1960 | Burns | 137—39 |

CLARENCE R. GORDON, *Primary Examiner.*